(12) United States Patent
Singh

(10) Patent No.: US 10,166,618 B2
(45) Date of Patent: Jan. 1, 2019

(54) HEAT STOP FOR BRAZING OR SOLDERING

(71) Applicant: International Business Machines Corporation, Armonk, NY (US)

(72) Inventor: Prabjit Singh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/996,359

(22) Filed: Jan. 15, 2016

(65) Prior Publication Data

US 2017/0203392 A1    Jul. 20, 2017

(51) Int. Cl.
  *B23K 1/00*    (2006.01)
  *B23K 31/00*   (2006.01)
  *B23K 33/00*   (2006.01)

(52) U.S. Cl.
  CPC .......... *B23K 1/0008* (2013.01); *B23K 31/003* (2013.01); *B23K 33/006* (2013.01)

(58) Field of Classification Search
  None
  See application file for complete search history.

(56) References Cited

U.S. PATENT DOCUMENTS

| 5,620,208 A | 4/1997 | Kirkham |
| 2014/0367960 A1 | 12/2014 | Uenishi et al. |

FOREIGN PATENT DOCUMENTS

| CN | 100419326 C | 9/2008 |
| GB | 2196556 B | 5/1988 |
| JP | 2005121297 A | 5/2005 |
| JP | 2014129855 A | 7/2014 |

*Primary Examiner* — Adam Krupicka
(74) *Attorney, Agent, or Firm* — Scott S. Dobson

(57) ABSTRACT

A metal block has a joint element. The joint element is defined between a trench in an outer surface of the metal block and a hole extending from the outer surface of the metal block to the interior space. The trench is configured such that when heat is applied to the joint element the trench reduces dissipation of the heat throughout the metal block. The hole is configured to receive a metal tube.

13 Claims, 5 Drawing Sheets

HEAT STOP FOR BRAZING OR SOLDERING

BACKGROUND

The present disclosure relates to joining components by producing metallurgical joints between the components being joined via brazing or soldering, and more specifically to joining components with a substantial size difference by such processes. Both brazing and soldering use heat and a filler material to produce the metallurgical joints between metal components, but differ in the temperatures utilized.

SUMMARY

According to embodiments of the present disclosure, described herein is an apparatus including a metal block having an interior space and a joint element. The joint element is defined between a trench in an outer surface of the metal block and a hole extending from the outer surface of the metal block to the interior space. The trench is configured such that when heat is applied to the joint element the trench reduces dissipation of the heat throughout the metal block. The hole is configured to receive a metal tube.

Further disclosed herein are embodiments of a method for joining a metal tube and a metal block. The method includes inserting a metal tube into a hole extending from an outer surface of a metal block to an interior space within the metal block. A joint element is defined between a trench in the outer surface of the metal block and the hole. The metal tube and the metal block are joined by a process selected from a group consisting of soldering and brazing. The process includes heating the joint element. The trench reduces the dissipation of heat throughout the metal block when heat is applied to the joint element.

Further disclosed herein are embodiments of a method for creating a joint element on a metal block according to embodiments of the present disclosure. The method includes creating a hole in the metal block extending from an outer surface of the metal bock to an interior space within the metal block. The hole is configured to receive a metal tube and has a lip configured to provide a stop for the metal tube a joint width. A trench is created around the hole in the outer surface of the metal block such that a joint element is formed between the hole and the trench. The trench is configured to minimize the dissipation through the block of heat applied to the joint element.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
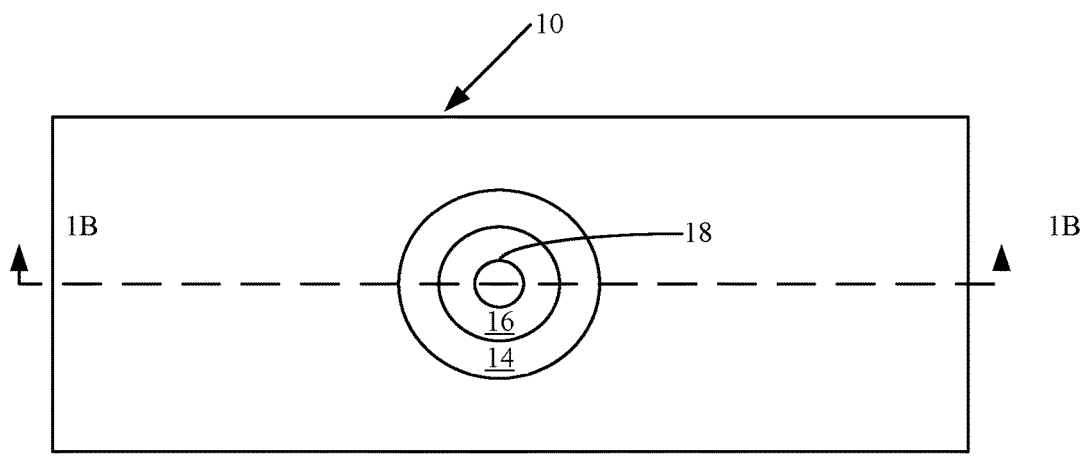
FIG. 1A depicts a top view of a metal block with a joint element, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to brazing and soldering processes, and some more particular aspects relate to the use of brazing and soldering to join components of disparate size. While the present disclosure is not necessarily limited to such applications, various aspects of the disclosure may be appreciated through a discussion of various examples using this context.

Use of brazing or soldering to join two components with a substantial size differential may prove problematic due to the greater mass of the larger component, i.e., a metal block, drawing heat from the joint. This can lead to a poor quality, porous joint and subsequent failure of the final joined apparatus. Embodiments of the present disclosure provide a metal block with a trench that serves to reduce the dissipation of heat throughout the metal block when heat is applied to a joint element during soldering or brazing. The joint element may be configured with dimensions that correlate to the dimension of the smaller component, i.e. a tube, and such a correlation may improve the effectiveness of the joint element.

Figure 1B:
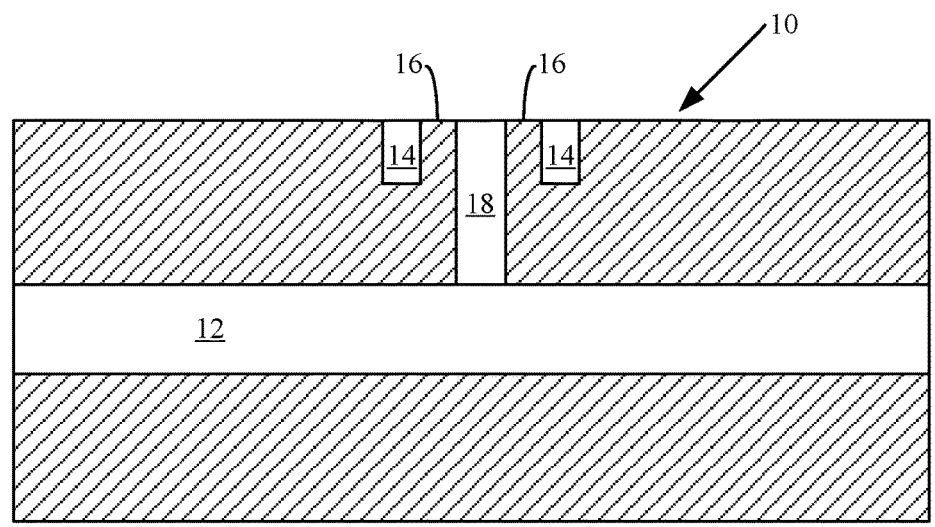
FIG. 1B depicts a cutaway side view of the metal block in FIG. 1A, according to embodiments.

FIG. 1A depicts a metal block 10 with a joint element 16, according to embodiments of the present disclosure. The metal block 10 may be any metal, but metals with significant thermoconductive properties, such as copper, may benefit more from use of the joint element 16. FIG. 1B depicts a cross-section of block 10, according to the embodiments. FIG. 1A provides an overhead view of features of the present disclosure, including a hole 18 lying within the joint element 16 which itself lies within a trench 14. As depicted in FIG. 1B, the metal block 10 may incorporate an interior space 12. When the interior space 12 is present, it may have widely variable dimensions to accommodate different materials and purposes of the final assembly. The hole 18 is present as a feature of the block 10 and may be configured to receive a tube to be joined to the joint element 16. The dimensions of the hole 18 may be determined by the dimensions of the tube to be received. Tubing or piping of any material, nominal size, gauge, or schedule may be used, but the joint element may be particularly advantageous when joining thin-walled copper tubes, such as types K, L, or M, to the metal block. In some cases, the hole 18 may extend from an outer surface of the metal block 10 through to the interior space 12, as seen in FIG. 1B. The trench 14 is around the hole 18 and the joint element 16 lies between the hole 18 and the trench 14.

As used herein, the thickness of the joint element 16 describes the distance between the edge of hole 18 and the edge of the trench 14. The thickness of the joint element may vary greatly across different embodiments. In some embodiments, the joint element 16 may be configured to have a thickness that is generally similar to the dimensions of the tube—for instance, the thickness of the joint element 16 may be configured to be substantially the same as the wall thickness of the tube to be received.

The dimensions of the trench 14 may vary widely in both depth and width across different embodiments, but the trench width may be selected to minimize heat transfer from the joint element 16 to the remainder of the metal block 10. In some embodiments, the depth of the trench 14 may correspond to the joint width, i.e., the length of the overlap between the two components to be joined. In other embodiments, the depth may be substantially similar to twice the joint width or any other depth. The trench 14 may be inscribed with a generally circular shape as seen in the overhead view of FIG. 1A, or may take other shapes, regular or irregular, as determined by the components to be joined or to accommodate other features that may lie in the path of the trench. As an example of this, an embodiment may be designed to have two joint elements relatively close to one another, such that the trench around the second joint element may overlap the trench around the first joint element, resulting in a single continuous trench with a shape generally similar to a figure-eight. FIG. 1B shows the trench 14 with a generally rectangular cross-sectional shape, but the rectangular shape is only one option and the cross-sectional shape of the trench may vary across embodiments.

Embodiments of the present disclosure may be found to have diverse uses, but may be particularly useful for the construction of heat exchangers or piping manifolds. The hollow space 12 may provide an inlet or an outlet for the flow of a fluid through the hole 18. In some embodiments there may be multiple holes to allow for distributed flow out of the interior space 12 or, alternatively, for consolidated flow into the interior space 12. When multiple holes are present they may be arranged such that the tubes received within the holes are in a parallel configuration with each other—an arrangement that may be suited for utilizing the block in the construction of a heat exchanger.

Figure 2A:
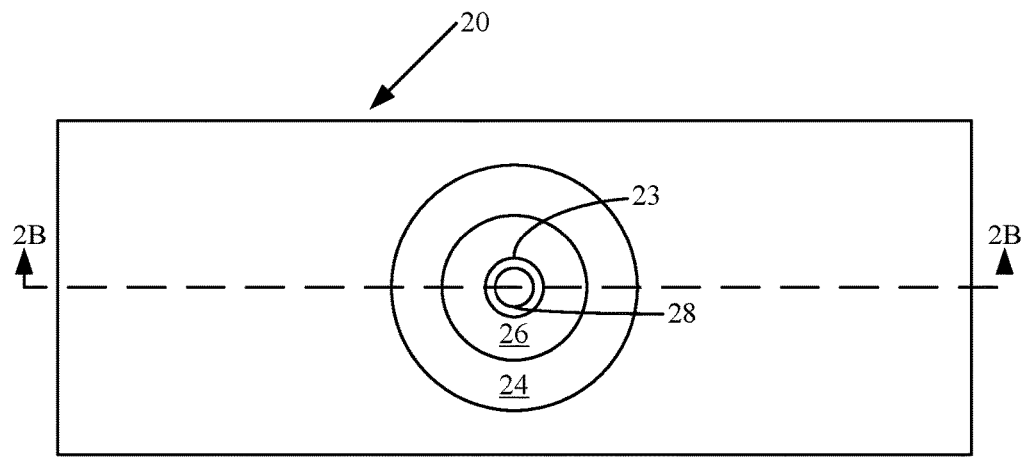
FIG. 2A depicts a top view a metal block showing an alternative embodiment of a metal block with a joint element.
Figure 2B:
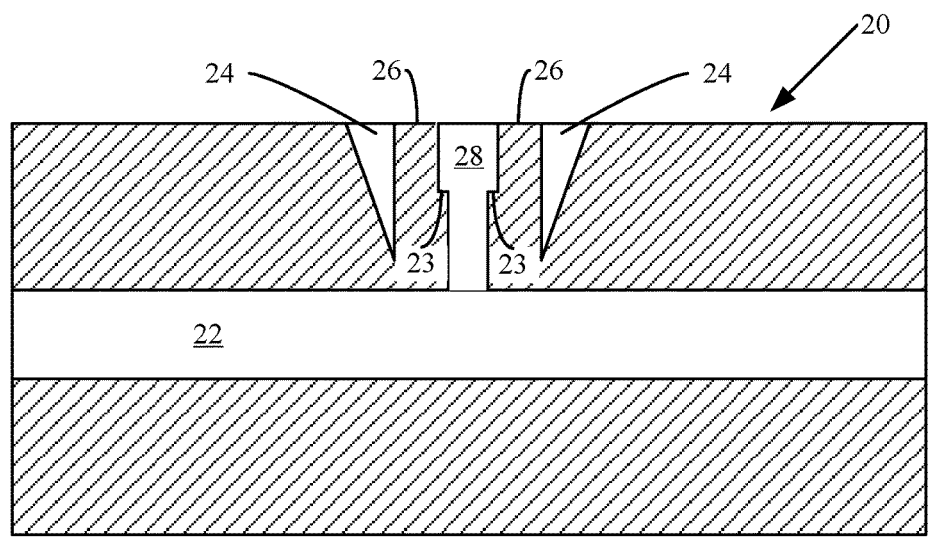
FIG. 2B depicts a cutaway side view of the metal block in FIG. 2A, according to embodiments.

FIG. 2A depicts another metal block 20 according to embodiments of the present disclosure. The block 20 features a trench 24 surrounding a joint element 26 which itself surrounds a hole 28. FIG. 2B depicts a cross-section of block 20, according to the embodiments. In FIG. 2B, interior space 22, which may be present within block 20, is shown. Visible in FIGS. 2A and 2B is a lip 23 lying within the hole 28 and extending inward. The lip 23 may provide a stop for the alignment of the joint. More specifically, a tube inserted into the hole 28 may be prevented from traveling too far into the hole 28 by the lip 23 preventing further progress of the tube. The lip 23 may be placed to achieve a particular joint width or at any other desired stop point for the tube.

Trench 24 has a conical shape visible from the cross-sectional view of FIG. 2B, wherein the trench 24 narrows from an opening at an outer surface of the block 20 to the base of the trench 24 due to a sloped outer wall. Possible advantages of this configuration may be to conserve the integrity of the block 20 or to facilitate applying a direct heat source to the joint element 26 by allowing a torch or other direct heat source to be inserted into the trench 24. FIG. 2B shows the depth of the trench 24 extending generally about twice as far into the block 20 as the lip 23, making the depth generally about two times the joint width. This is one possible configuration of the trench 24, but, in other embodiments, it may be created with a depth equal to the joint width or any other depth.

Figure 3A:
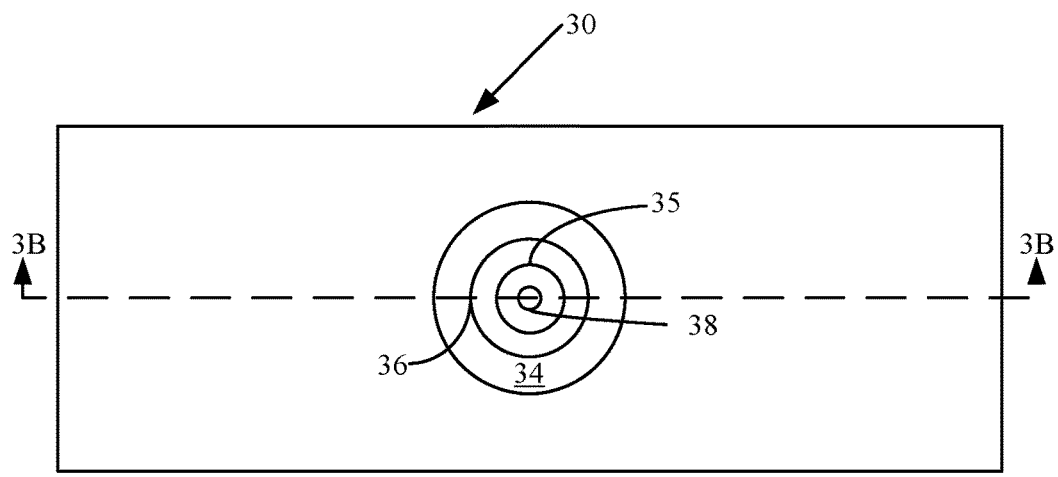
FIG. 3A depicts a top view of a metal block with a joint element and an inserted metal tube, according to embodiments.
Figure 3B:
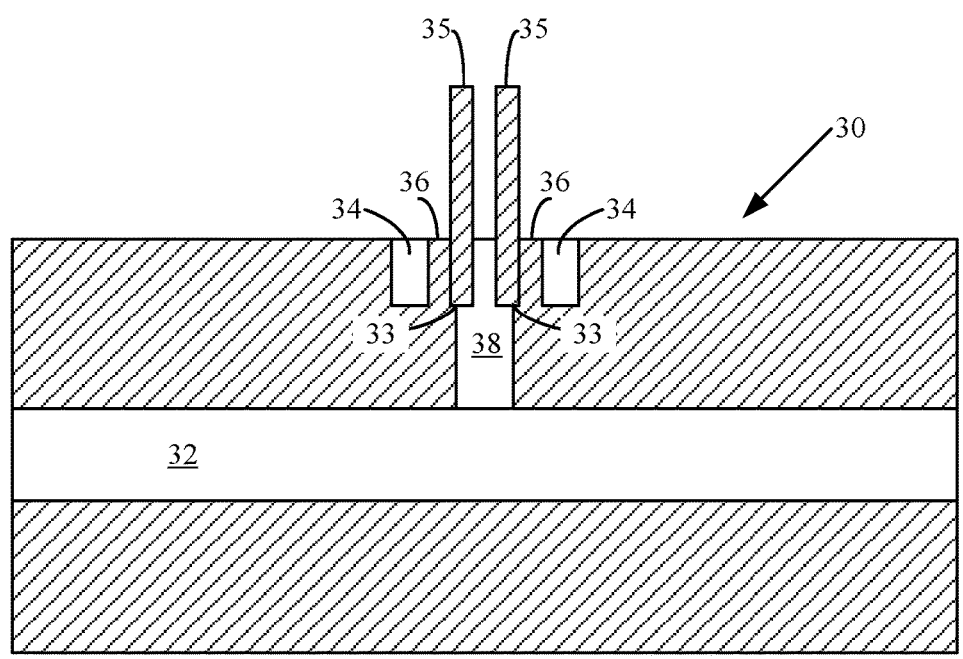
FIG. 3B depicts a cutaway side view of the metal block with the joint element and the inserted metal tube in FIG. 3A, according to embodiments.

FIG. 3A shows an assembly including a metal block 30 and a metal tube 35, according to embodiments. A hole 38 is partially visible through the opening of the tube 35. A joint element 36 is visible around the tube 35, the joint element 36 itself surrounded by a trench 34. FIG. 3B depicts a cross section of the assembly of block 30 and tube 35, according to the present embodiments. FIG. 3B shows the hole 38 penetrating through to the block's interior space 32. Lip 33 is depicted as being in line with the base of trench 34, which is one possible configuration of the assembly. The tube 35 is shown to be within hole 38 and aligned to stop at lip 33. Additionally, there may be a joint filler material present at the location where the two components meet, such as at the location of the lip 33 in FIG. 3B. The joint filler material may alternatively be present the full length of the overlap between the two components (tube 35 and joint element 36), or present for only a portion of the length of the overlap. The joint element 36 is visible in both FIG. 3A and FIG. 3B, and may generally, in some embodiments, be as wide as the wall thickness of tube 35. In some embodiments, the trench 34 is filled with an epoxy compound. The trench 34 may be filled to improve the integrity the block 30.

Figure 4:
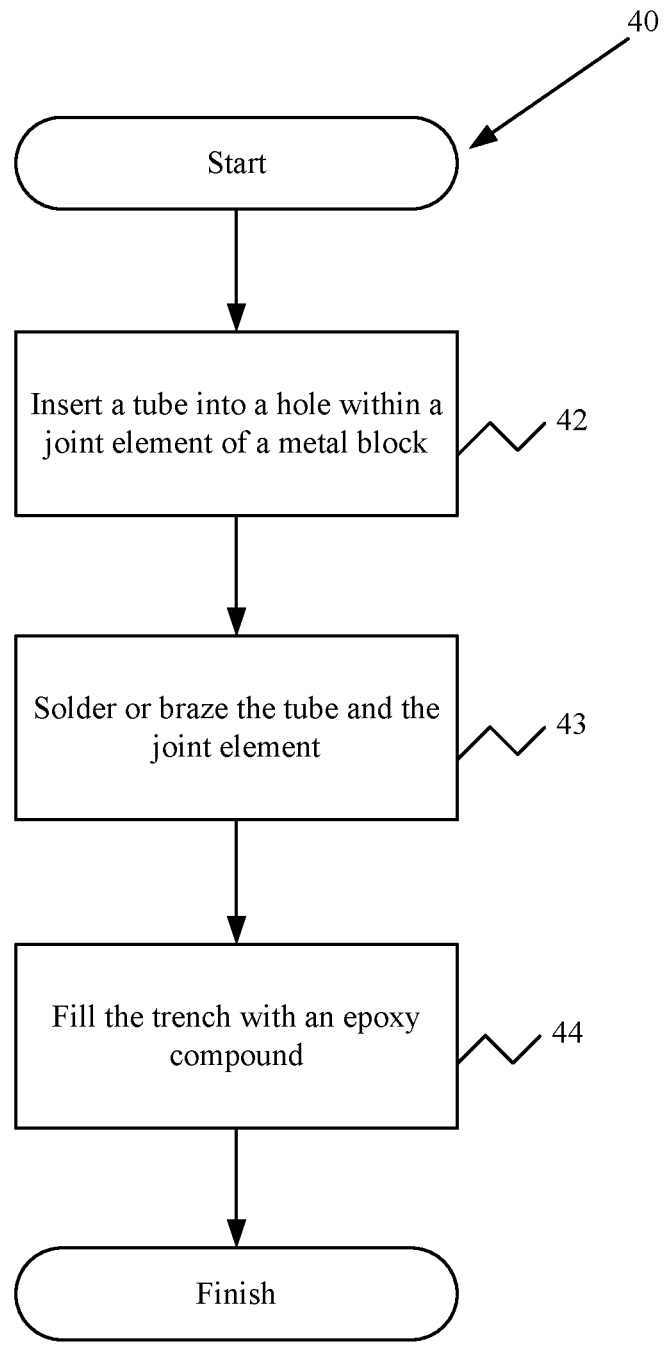
FIG. 4 shows a flowchart of a method for joining a tube and a metal block according to embodiments.

FIG. 4 depicts a flow diagram of an example method 40 for joining a tube to a metal block according to embodiments of the present disclosure. The process begins at operation 42 by inserting a tube into a block prepared in compliance with the embodiments described herein, so that the block has a hole to receive the tube, a joint element around the hole, and a trench around the joint element. The hole may extend from an outer surface of the metal block through to an interior space, and may also have a lip extending inward to stop the tube at a predetermined joint width or, in the absence of a lip, the tube may be inserted to any depth within the hole and clamped or otherwise held in place. In some embodiments it may be appropriate to apply a flux material or a joint filler material to the overlap between the tube and the hole prior to inserting the tube. In other embodiments, it may be appropriate to apply both a flux material and a joint filler material. The flux material may be applied by a variety of means including brushing, dipping, or use of an applicatory gun, but it is generally desirable to ensure the flux covers the entire joint surface of both components. It may also be appropriate to check for the proper clearance between the two components to allow capillary action to act on the filler material.

Once the tube is aligned within the hole in the metal block, the tube and metal block are joined according to operation 43—using either brazing or soldering. To begin, the joint element and the portion of the tube within the hole are heated. The components may be heated using any suitable heat source, including indirect heat sources, such as induction, or direct heat sources, such as a torch. The trench serves to reduce the dissipation of the applied heat throughout the metal block, and may provide additional advantages when a direct heat source is used, as the trench may be configured to facilitate use of the torch, or other direct heat source, to be applied to the joint element from within the trench. Once the joint is heated the joint filler material should be deposited, if it has not already been applied. The joint filler material may then be held near the heated joint, where it will melt and flow into the joint due to capillary action. The joint filler material will tend to flow toward areas of higher temperature, so if the joint filler material is being applied after heating, it may be preferable to apply the heat source from below the joint to aide in drawing the joint filler material down into the joint. Once the joint filler material has set, it may be desirable to clean the new joint, to remove any flux residue or oxide scale formed during the brazing or soldering process.

In some embodiments, the trench may be filled with an epoxy compound, as described in operation 44, after joining the tube to the joint element.

Figure 5:
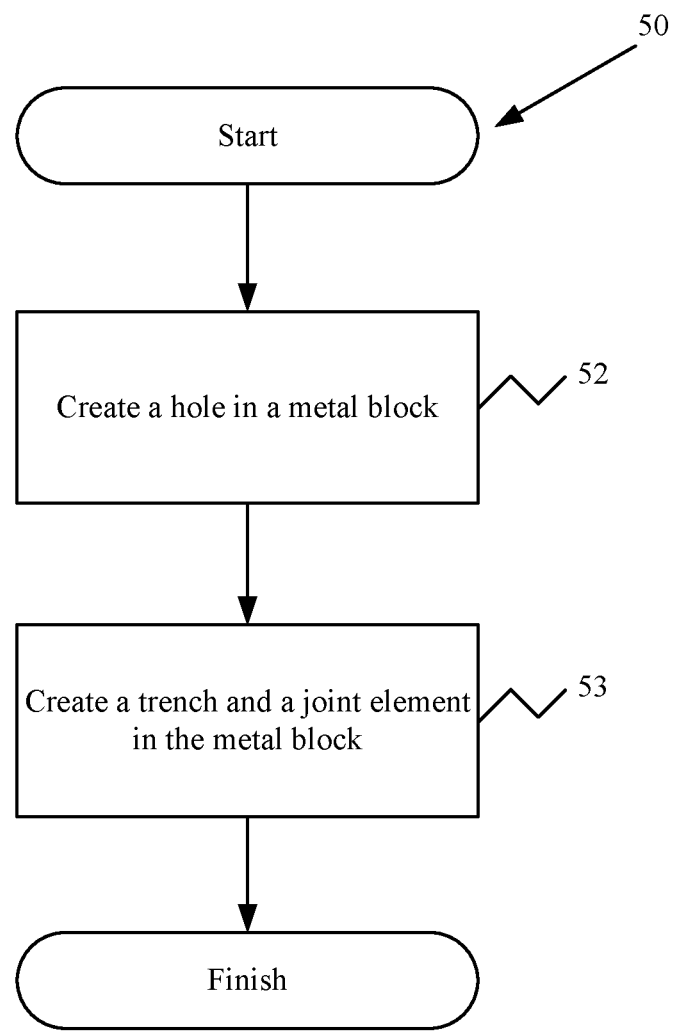
FIG. 5 shows a flowchart of a method for creating a joint element in a metal block according to embodiments.

In FIG. 5, an example method 50 for the creation of the joint element on a metal block is depicted using a flow diagram, according to embodiments. At operation 52, a hole is created in a metal block such that the hole can receive a tube. In some embodiments a lip may be created within the hole, as part of the process of creating the hole. The hole may extend all the way through the block, or from an outer surface of the block to an interior space, if an interior space is present, or terminate within the material of the metal block.

At operation 53 a trench is created around the hole such that a joint element is formed between the trench and the hole. If desired, the process may be repeated multiple times on a single block, to allow multiple tubes to be joined to a single block. The features of the block—the hole (and possibly the lip), the joint element, and the trench—may be created by any number of machining or other metal-working techniques, including milling, turning, threading, grinding, filing, sawing, laser-cutting, drilling, use of a chisel, shears, snips, water jet, plasma, or photochemicals, as well as others. Measurements and markings may be made prior to creating the features, as in the case of embodiments wherein the dimensions of the hole and the joint element correspond with the dimensions of the tube.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:
    a metal block having an interior space and a joint element, the joint element defined between a trench in an outer surface of the metal block and a hole extending from the outer surface of the metal block to the interior space, the trench configured to reduce dissipation, throughout the metal block, of heat applied to the joint element, the hole configured to receive a metal tube; and
    the metal tube joined to the metal block at the hole, wherein the trench is filled with an epoxy compound.

2. The apparatus of claim 1, wherein the metal tube joined to the metal block using a process selected from a group consisting of soldering and brazing.

3. The apparatus of claim 1, wherein the joint element has a thickness and the metal tube has a wall thickness and wherein the thickness of the joint element is substantially the same as the wall thickness of the metal tube.

4. The apparatus of claim 1, wherein the metal tube is a copper tube selected from a group consisting of Type K, Type L, and Type M.

5. The apparatus of claim 1, further comprising a lip extending inward within the hole, the lip configured to stop the metal tube as the metal tube is inserted into the hole.

6. The apparatus of claim 1, wherein the trench is formed by machining.

7. The apparatus of claim 1, wherein the trench has a rectangular cross-section.

8. The apparatus of claim 1, wherein the trench is configured to facilitate applying a heat source directly to the joint element.

9. The apparatus of claim 8, wherein the trench comprises a sloped outer wall such that the trench narrows from an opening to a base.

10. The apparatus of claim 1, wherein the trench inscribes a circular shape around the joint element.

11. The apparatus of claim 1, wherein the metal block comprises copper.

12. A method of creating a joint element on a metal block, the method comprising:
    creating a hole in the metal block extending from an outer surface of the metal block to an interior space within the block, the hole configured to receive a metal tube, the hole having a lip configured to provide a stop for the metal tube at a joint width;
    creating a trench around the hole in the outer surface of the metal block such that a joint element is formed between the hole and the trench, the trench configured to minimize dissipation, throughout the block, of heat applied to the joint element;
    joining the metal tube to the metal block at the hole; and
    filling the trench with an epoxy compound.

13. The method of claim 12, the trench has an outer wall sloped to facilitate applying heat to the joint element.

* * * * *